(12) United States Patent
Cobb et al.

(10) Patent No.: US 11,943,242 B2
(45) Date of Patent: Mar. 26, 2024

(54) DEEP AUTOMATION ANOMALY DETECTION

(71) Applicant: Honda Motor Co., Ltd., Minato-ku (JP)

(72) Inventors: Derrick Ian Cobb, Delaware, OH (US); Richard Wolfgang Geary, Hillard, OH (US); Douglas J Spaur, Springfield, OH (US)

(73) Assignee: Honda Motor Co. Ltd., Tokyo (JP)

( * ) Notice: Subject to any disclaimer, the term of this patent is extended or adjusted under 35 U.S.C. 154(b) by 436 days.

(21) Appl. No.: 17/218,903

(22) Filed: Mar. 31, 2021

(65) Prior Publication Data

US 2022/0321585 A1  Oct. 6, 2022

(51) Int. Cl.
*H04L 9/40* (2022.01)
*G06F 11/32* (2006.01)
*G06N 20/00* (2019.01)

(52) U.S. Cl.
CPC ........ *H04L 63/1425* (2013.01); *G06F 11/327* (2013.01); *G06N 20/00* (2019.01)

(58) Field of Classification Search
CPC .. G06F 11/3096; G06F 11/327; G06F 11/328; G06N 20/00; G06N 3/08
See application file for complete search history.

(56) References Cited

U.S. PATENT DOCUMENTS

| | | | |
|---|---|---|---|
| 9,384,603 B2 | 7/2016 | Ishikawa et al. | |
| 9,483,049 B2 | 11/2016 | Maeda et al. | |
| 10,410,135 B2* | 9/2019 | Shumpert | G06N 20/00 |
| 2021/0019528 A1* | 1/2021 | Ghadyali | G06F 11/3409 |
| 2022/0414861 A1* | 12/2022 | Turnquist | G06T 7/0004 |

FOREIGN PATENT DOCUMENTS

| | | |
|---|---|---|
| JP | 4234251 B2 | 3/2009 |
| JP | 2009070071 A | 4/2009 |
| JP | 2017045141 A | 3/2017 |
| JP | 2019175202 A | 10/2019 |

\* cited by examiner

*Primary Examiner* — Olugbenga O Idowu
(74) *Attorney, Agent, or Firm* — Stinson LLP

(57) ABSTRACT

Examples of the disclosure enable detecting an anomalous state in a machine. The method is performed by an anomaly detection server. The method includes receiving training analysis vectors associated with a monitored machine during a training period. The method also includes applying the training analysis vectors to a machine learning model to create a trained machine learning model configured to describe normal states in the monitored machine as indicated by training analysis vectors. The method further includes receiving monitoring analysis vectors associated with the monitored machine during a monitoring period. The method also includes applying the monitoring analysis vectors to the trained machine learning model to identify at least one discrepancy indicating an anomalous state in the monitored machine. The method further includes transmitting an alert indicating that an anomaly is detected in the monitored machine.

20 Claims, 8 Drawing Sheets

DEEP AUTOMATION ANOMALY DETECTION

BACKGROUND

In many known production systems, detection of anomalous conditions in machinery and equipment is of significant importance because such conditions can lead to downtime and disruption of valuable resources that may be critical to ensuring production. The principal goal in anomaly detection is to reduce the mean time to repair ("MTTR") any machinery or equipment in order to minimize disruption.

In many production systems, the condition, design, manufacture, and history of machinery and equipment may vary greatly. Because of such variation, known systems fail to provide broad approaches to identify anomalous conditions in machinery. Instead, anomaly detection typically relies or depends upon human intelligence and expertise from people with familiarity with the operating conditions and normal operating state of particular machinery.

This approach has several limitations. First, by relying upon human expertise, the approach necessarily has scalability problems. Second, reliance on any human-based system is exposed to risk of expertise becoming unavailable as workers change roles or leave organizations. Third, human-based systems are exposed to biases including, for example, false positive detection and false negative detection. Fourth, the increasing complexity of machinery and equipment makes human-based analysis at greater risk of successfully diagnosing anomalies.

Although automated systems are desired for anomaly detection, known systems fail to provide effective methods of anomaly detection across varying equipment and machinery type. Instead, known anomaly detection systems are specific to particular machinery or equipment.

Accordingly, systems and methods are desired that provide anomaly detection of machinery and equipment across a variety of designs, manufactures, and conditions.

SUMMARY

Examples of the disclosure enable detecting an anomalous state in a machine. The method is performed by an anomaly detection server. The method includes receiving training analysis vectors associated with a monitored machine during a training period. Each of the training analysis vectors describes a condition of the monitored machine at a corresponding point in time. The method also includes applying the training analysis vectors to a machine learning model to create a trained machine learning model configured to describe normal states in the monitored machine as indicated by training analysis vectors. The method further includes receiving monitoring analysis vectors associated with the monitored machine during a monitoring period. Each of the monitoring analysis vectors describe a condition of the monitored machine at a corresponding point in time. The method also includes applying the monitoring analysis vectors to the trained machine learning model to identify at least one discrepancy indicating an anomalous state in the monitored machine. The method further includes transmitting an alert indicating that an anomaly is detected in the monitored machine.

In another aspect, an anomaly detection system is provided for detecting an anomalous state in a machine. The anomaly detection system includes a machine including at least one sensor device configured to monitor the machine condition. The anomaly detection system also includes an anomaly detection server in communication with the at least one sensor device. The anomaly detection server includes a memory and a processor. The processor is configured to receive training analysis vectors associated with a monitored machine during a training period from the at least one sensor. Each of the training analysis vectors describes a condition of the monitored machine at a corresponding point in time. The processor is also configured to apply the training analysis vectors to a machine learning model to create a trained machine learning model configured to describe normal states in the monitored machine as indicated by training analysis vectors. The processor is further configured to receive a monitoring analysis vectors associated with the monitored machine during a monitoring period from the at least one sensor. Each of the monitoring analysis vectors describes a condition of the monitored machine at a corresponding point in time. The processor is also configured to apply the plurality of monitoring analysis vectors to the trained machine learning model to identify at least one discrepancy indicating an anomalous state in the monitored machine. The processor is further configured to transmit an alert indicating that an anomaly is detected in the monitored machine.

In yet another aspect, an anomaly detection server is provided. The anomaly detection server is in communication with at least one sensor device. The anomaly detection server includes a memory and a processor. The processor is configured to receive training analysis vectors associated with a monitored machine during a training period from the at least one sensor. Each of the training analysis vectors describes a condition of the monitored machine at a corresponding point in time. The processor is also configured to apply the training analysis vectors to a machine learning model to create a trained machine learning model configured to describe normal states in the monitored machine as indicated by training analysis vectors. The processor is further configured to receive a monitoring analysis vectors associated with the monitored machine during a monitoring period from the at least one sensor. Each of the monitoring analysis vectors describes a condition of the monitored machine at a corresponding point in time. The processor is also configured to apply the plurality of monitoring analysis vectors to the trained machine learning model to identify at least one discrepancy indicating an anomalous state in the monitored machine. The processor is further configured to transmit an alert indicating that an anomaly is detected in the monitored machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
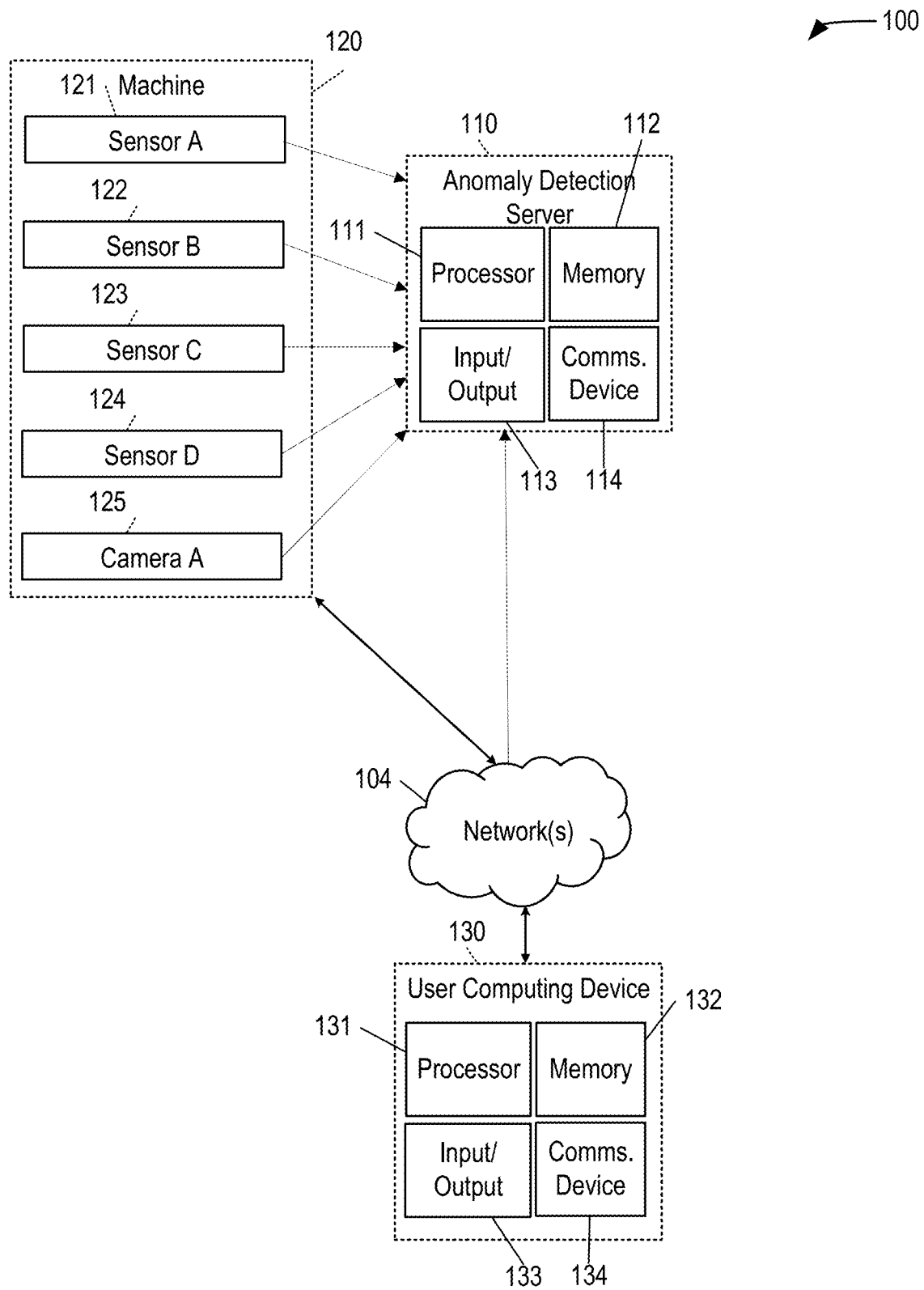
FIG. 1 is a schematic diagram of an example environment for anomaly detection in a machine by an anomaly detection server.

Corresponding reference characters indicate corresponding parts throughout the drawings. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to systems and methods for deep automation anomaly detection in machinery and other equipment used in manufacturing and production environments. The systems and methods described herein provide anomaly detection capabilities for a broad variety of machines provided that the state, sequence, and timing information for machines can be obtained. An anomaly detection server is provided that is configured to identify states, sequences, and timing patterns that are associated with anomalous operation of a machine or machines. To accomplish this, the anomaly detection server creates a bitwise representation of the state, the sequence, and the timing of machine operation and learns the representations associated with normal operation. Thereby, the anomaly detection server learns the conditions under which a machine is not in normal operation, indicated because the bitwise representation for such conditions are outside the learned patterns defining normal states, sequences, and timing of operation.

As described above, known approaches to anomaly detection are deficient for multiple reasons. First, most known anomaly detection approaches are reliant upon human expertise and resultantly are difficult to scale or to automate. Second, most known approaches to anomaly detection are inherently limited to a particular machine or a particular category of machines because the approaches focus on known trends or patterns indicating anomalous behavior in particular machines. However, the inherent variety of machine types makes it difficult to extend known anomaly detection approaches to varying classes of machines using such a machine-centric approach. Third, known anomaly detection approaches often result in false positives or false negatives because the approaches overly rely upon the past experience with machine performance (typically as experienced by human expert users) and fail to capture trends and variations in particular machines.

The anomaly detection server and related systems and methods overcome the known deficiencies in anomaly detection approaches by providing a technologically driven solution rooted in computing technology and machine learning capable of detecting anomalous states across varying machine types. Thus, the server, systems, and methods described herein provide a technological improvement to the field of industrial machine maintenance, repair, and management. The systems described specifically provide robust methods for detecting anomalies in industrial machines to reduce time to investigate machine performance, reduce mean time to repair ("MTTR") machinery, reduce downtime, and improve industrial stability. At a granular level, the systems and methods described use state, sequence, and timing information to identify anomalies while also identifying machine misalignments or system misalignments. As used herein, the term "misalignment" is used to describe a status when portions of a machine or machines are not in compatible states thereby undermining process performance. Anomaly detection based on state, sequence, and timing may be used to isolate components or parts of a machine that are anomalous. These components or parts may be focused on for repair. Misalignments may similarly be focused on to avoid systemic issues.

As used herein, the term "anomaly" is used to describe a condition or state that is a statistical outlier, a novelty, or something outside of normal conditions. In the examples described, an anomaly may exist when a machine or a piece of equipment in a manufacturing process is not functioning in a normal or expected fashion. By contrast, as used herein, the term "normal" is used to describe a condition or state that is expected or within normal statistical boundaries.

As used herein, the term "false positive" or "false anomaly" refers to an incorrect determination that an anomaly condition exists in a machine. A false positive or a false anomaly may be detected based on inaccurate modeling to describe the range of normal operating states, or based on incorrect or incomplete input regarding the machine. The anomaly detection server described herein is designed to avoid the risk of false positives based on efficient and adaptive modeling.

The anomaly detection server described is configured provide anomaly detection for a wide variety of machines in manufacturing settings. In an example embodiment, the anomaly detection server includes a processor and a memory. In some examples, the anomaly detection server includes a suitable communications interface for interacting with any other devices or networks and an input/output for receiving input and presenting output using any suitable interfaces or displays. In some embodiments, the anomaly detection server is in communication with or coupled to sensors that are attached to at least one machine. Such sensors capture machine condition data about each machine and transmit the machine condition data to the anomaly detection server via a machine-side communications interface which transmits to the anomaly detection server via any suitable networking protocol. (In at least some examples, the anomaly detection server is integrated with one or more machines and directly accesses such machine condition data.) In such embodiments, the anomaly detection server is part of an anomaly detection system that may include such sensors, networks, machines, and communications interfaces. In further embodiments, machine condition data is captured at least partially using one or more cameras that monitor the condition of machines and thereby capture the physical state of the machines. In some such examples, some cameras may be located within the machine and transmit internal machine condition information. In such examples, the cameras are also capable of communicating with the anomaly detection server using a suitable communications interface along any suitable networking protocol Image or video data captured by such cameras may be processed to obtain suitable representations of the machine state including a bitwise or hexadecimal representation, as described below.

In many embodiments, the anomaly detection server is configured to provide anomaly detection software ("ADS") that, when executed, provides the anomaly detection functions described. In some embodiments, the ADS further utilizes descriptive analytics to process state, sequence, and timing ("SQT") information associated with each machine or group of machines that are monitored for potential anomalies. As used herein, the term "state" refers to unique condition of the system as determined by input information. As used herein, the term "sequence" refers to the order of steps performed within a given machine to carry out the actions of a normal process. As used herein, the term "timing" refers to the timing of steps, between steps, and between steps and function changes. As used herein, a "step" is a number reflecting a unit value of progress in a step counter in a machine. Steps are used to monitor the progress of machines through their purposes. As the "State", "SeQuence", and "Timing" are used to identify normal operations of each machine involved in the process, the SQT functions as a building block used by the anomaly detection server.

As used herein, "descriptive analytics" are analytics that are actionable and allow a user to, for example, identify a possible anomaly and further to diagnose it based on possible underlying causes of the anomaly. In some embodiments, the ADS is also configured to provide an anomaly detection interface ("ADI") that allows for interaction with users via a suitable input/output interface (e.g., a monitor, touchscreen, keyboard, and/or mouse) to present detected anomalies and aid in resolving such anomalies.

The anomaly detection server is configured to receive registration input defining machines within a production environment. In some examples, multiple machines may be used in a specific order (e.g., within an assembly line) or multiple orders. Each machine is capable of performing one or more steps reflecting physical actions that a machine may take. In most examples, the registration input defines physical attributes of each machine including the input that may be provided by each machine with respect to its performance. The registration input may also define the sequence of steps performed by each machine. In some examples, the registration input may also define the steps of multiple machines with respect to one another in a process and allow the anomaly detection server to therefore identify anomalies within the sequenced process across machines. The registration input may also include purpose information defining the purpose of each machine. As used herein, a "purpose" describes the role of each machine in the relevant process, describing what result each machine provides for the process. The registration input may also include step information defining each step taken by the machine within the relevant process. The registration input may also include phase information defining each phase of operation provided by each machine. As used herein, a "phase" is a group or combination of steps which typically are associated with a real-world task performed by the machine at issue. In one example, a machine may be used to weld together several pieces of a chassis. The purpose may therefore be welding, there may be several distinct welding phases for each welded section, and each welding phase may have individual steps for each action performed by the machine in each welding phase (e.g., moving the welding arm from one position to another, activating the welding torch, or changing the orientation of the welding torch). Thus, the anomaly detection server is configured to receive registration input defining each machine including purpose definitions, phase definitions, and step definitions.

The anomaly detection server applies the registration input to create a first map configured to convert condition data into an analysis vector for the machine. Specifically, the first map allows the anomaly detection server to generate the analysis vector based on condition data received, directly or indirectly, from each machine. (In some examples, the location of each machine is referred to as a "station" and the anomaly detection server defines the model for operation across all such stations.) The analysis vector describes states of each machine (or component.) State information may be reflected in a bitwise binary format, a hexadecimal format, or any other suitable form. As described below, the anomaly detection server similarly may be configured to map each machine with respect to sequence and timing and to learn normal operating states, sequences, and timings ("SQT") based on the corresponding data. In so doing, the anomaly detection server is configured to essentially reverse engineer a finite-state machine ("FSM") model for each machine as the anomaly detection server learns all (or nearly all) possible normal patterns for each of SQT. As used herein, a finite-state machine model is a mathematical model of computation whereby a real machine is analyzed as an abstract machine having n number of possible states at any given time. However, in an FSM model, the real machine can only be in one of the n states.

In one example, the registration input represents a functional map created by a human, as indicated below in FIG. 6. Specifically, the functional map of the registration input defines which registers (e.g., inputs or outputs from sensor inputs or outputs, typically represented as numeric binary, decimal, or hexadecimal values with lengths of one or more units) are associated with each function. Therefore, in some embodiments, a human provides the definition of the functional map, the registration inputs, and indirectly of the register relationships and vectors. In other examples, a computer system may act independently or with human guidance to define the functional map, the registration inputs, and indirectly of the register relationships and vectors.

In an example embodiment, the first map defines a vector of bits that contain all possible representations of machine state data for a particular machine. In one case, the analysis vector is a one-dimensional vector. In the example embodiment, the first map is created specific to each machine based on registration input whereby the first map allows for the creation of n unique, finite states for a particular machine and a possible vector length of m. Assuming the amount of possible values for each digit of the vector is x, the value of n may be described as $n=x^n$. If a particular machine has possible thirty-two possible binary values for encoded machine condition data there are $n=2^{32}$ possible finite states for the machine. The first map also creates any necessary encoding of received condition data into the analysis vector. The condition data may be initially received as, for example, analog signal data, digital signal data, audio data, video data, or image data. In an example embodiment, machines utilize sensors that provide the analysis vector directly to the anomaly detection server. However, the anomaly detection server is capable of any necessary processing and encoding if the condition data is not provided in the form of an analysis vector.

As described above, the anomaly detection server learns the possible states, sequences, and timing of each machine in normal operation. To accomplish this, the anomaly detection server also receives condition data from each machine. The anomaly detection server applies the first map, as needed, to convert condition data where condition data is not provided in the form of an analysis vector. The condition data provided may reflect functions performed by each machine including, for example, inputs, outputs, and steps. As used herein, the term "function" represents a collection of values (e.g., hexadecimal values or bits) that represent sub-systems in a particular machine. In some examples, an analysis vector may be defined specific to each function (or sub-system) of a machine. This approach may allow the analysis vectors to be shorter and to only include values likely to be used by each component.

In operation, the anomaly detection server receives condition data in order to learn and recognize acceptable normal patterns of states across sequences and timing. Specifically, the anomaly detection server receives condition data reflecting the state of each register of each machine or sub-system (encoded in any suitable form including binary or hexadecimal) while the process is performed. In a first example, a machine learning model in the anomaly detection server is trained actively by using the machine in all suitable variations to carry out a process. In a second example, the machine learning model in the anomaly detection server is trained passively by letting the machine execute the process a suitable minimum number of times in order to capture the variations of the process. As the learning process continues, the anomaly detection server obtains analysis vectors (directly from the machine, or after suitable processing of machine condition data) sufficient to provide a minimum sample size to define normal conditions. In at least some examples, the minimum sample size is bound by the subset o of finite-states n that are possible to create for analysis vectors. Thus, as explained above, the process of learning at least partially represents reverse engineering of an FSM model for each machine.

In one aspect, the state information reflected in the analysis vectors used to train the machine learning model are time-invariant, meaning that the first order of training performed on analysis vectors is not a direct function of time. However, as the anomaly detection server receives and processes the analysis vectors defining states to learn normal operation, the anomaly detection server also obtains suitable sequencing information and timing information. Each analysis vector for a given state is also obtained with necessary time stamps. As a result, the anomaly detection server is able to learn all known patterns of analysis vectors, and therefore learn the normal models of operation of the FSM for each machine. In one aspect, the patterns learned are a function of sequencing such that a series of states a, b, c, d, and e are analyzed to determine which sequences are normal and which are not. (As a practical example, where a machine performs welds at various joints, welds to outer joints may be performed last. In such an example, the anomaly detection server may be aware of a state x for performing an inner joint weld and state y for performing an outer joint weld. The sequence of xy is expected to be reflected in training data and thus describing a normal pattern of sequencing while the sequence of yx is not expected to be in the training data.)

Similarly, in many examples the intervals of time between steps may be relevant to the proper performance of a process. Thus, in many examples, the machine learning model trains by learning time stamps associated with each state and learns the appropriate intervals between steps. In some examples, the anomaly detection server may therefore identify increasing delays between a first and second step and identify an anomaly that may reflect deterioration of parts that is causing the lag. In other examples, the anomaly detection server may identify undue variations in timing between steps indicating that some component(s) is behaving in an erratic fashion and may indicate anomalous conditions. In operation, to train on sequencing and timing, machine condition data and analysis vectors include at least a time stamp to allow for time sorting used to organize the analysis vectors. Further, in some examples, the anomaly detection server also receives a sequencing identifier for each analysis vector to facilitate such time sorting.

The above description on machine learning assumes that training occurs during normal processing. In some examples, the training of the anomaly detection system may be conducted when a machine is (intentionally or unintentionally) in an anomalous state. In many examples, the ADI allows a user to categorize, tag, or otherwise annotate state, sequence, and timing data for a machine to indicate whether the underlying data is normal or anomalous. Thus, in some contexts, training may be performed using anomalous data. In such cases, the anomalous data is not used to describe the normal conditions but rather to better define anomalous data patterns for states, sequences, and timing.

As it effectively applies an FSM model to identify all normal system states and behaviors (reflected in the changes in states over sequences and timing), the SQT data provides fundamental measures of normal behavior for a machine (or machines) within a process. In one respect, this approach may be referred to as "machine sanity" which allows the anomaly detection server, related systems, and human users to have a clear understanding of when states of machines, components, or multiple machines are anomalous.

A machine learning model for a machine or machines may be deemed to be sufficiently trained when: (i) the machines have run for a predetermined amount of cycles that are expected to encompass normal behavior; (ii) the machines have completed cycles for all possible states of the n finite states; or (iii) the anomaly detection server is able to establish a sufficient statistical sample size to determine normal states, sequencing, and timing. In one example, a machine learning model is trained upon completion of four hundred (400) cycles. However, the determination of sufficient training time may vary depending upon the context of the machine, the age of the machine, and the complexity of the machine. Upon sufficient training, the anomaly detection server may use the machine learning model to create a signature or boundary conditions indicating normal behavior. In some examples, the anomaly detection server learns all trained combinations of data (i.e., all relevant combinations of states, sequences, and timing data) and categorizes such trained combination data for rapid checking. Such categorized data may be used to create the signature or boundary conditions. The patterns for normal states, sequences, and timing may be stored in any suitable database that is included within or in connection with the anomaly detection server.

The anomaly detection server also monitors each relevant machine for a process and scans the machine condition data obtained in such monitoring to obtain analysis vectors. The monitoring analysis vectors are compared to the learned patterns described above to determine whether the monitoring analysis vectors are within normal behaviors or outside of them. In other words, the anomaly detection server scans for discrepancies between the models for normal operations of the machine and the machine condition data by comparing: (i) analysis vectors for each state to known normal states; (ii) analysis vector groups reflecting sequences to known normal sequences; and (iii) analysis vector groups reflecting timing sequences to known normal timing sequences. To compare sequences, the anomaly detection server repeatedly processes the monitoring analysis vectors (and any timing or sequence indicators) to extract an order and processes the analysis vectors into ordered groups to identify monitored sequences. The anomaly detection server compares each monitored sequence to known normal sequences that are stored in the signature, boundary conditions, or otherwise. Similarly, to compare timing sequences the anomaly detection server repeatedly processes the monitoring analysis vectors (and any timing indicators such as timestamps) to extract a time sequenced set of analysis vectors. The anomaly detection server compares the time sequenced sets of analysis vectors to known timed sequences that are stored in the signature, boundary conditions, or otherwise.

If the anomaly detection server determines that a discrepancy exists between the monitoring analysis vectors (whether individually or in sequence or timed sequence) and normal patterns, it transmits an alert indicating an anomaly or a potential anomaly. In one example, the alert is provided via the ADI or any other interface within the ADS. In one example, the anomaly detection server generates a visual indicator if the computer system identifies such a discrepancy between the model(s) for normal states, sequences, and timing and the actual operation of the machine indicated in the machine condition data. In one example, the anomaly detection server generates a "heat map" showing in which location (or station) the anomaly was detected, which machine is implicated, and approximately the percentage of completion of the cycle being performed when the anomaly was detected. (In such an example, the ADS is configured to track the physical or organizational location of each machine and component based on registration input. The ADS may further be configured to track the processing cycles based on registration input.) The heat map also may display colors associated with a predefined number of detected anomalies.

In some examples, where anomalous data is used to train the machine learning model of the anomaly detection server, the analysis vectors for such anomalies may also be associated with details identifying components or parts that are anomalous and possible solutions to resolve the anomaly. In other examples, upon each alert of an anomaly, the ADS may capture information for resolution of the detected anomaly. In one example, the captured information may allow a user to input at the ADI that the anomaly was a false positive. In some examples, such false positive information is used by the anomaly detection server to retrain the models for normal states, sequences, and timing and avoid a future false positive that is the same or similar. In a second example, the captured information may allow a user to enter input at the ADI identifying the diagnosis of the anomaly, the applied solution, and any result information. The anomaly detection server uses such input to provide more sophisticated diagnostic and analytic recommendations when future anomalies are detected.

As described above, in some examples the anomaly detection server applies the same approach to an entire process spanning multiple machines. Thus, in such examples an anomaly detection server may analyze varying analysis vector types (for each machine) to determine sequences and timed sequences of patterns for the process as a whole. In such examples, the anomaly detection server may then train to the entire process and monitor based on input from multiple machines. If the anomaly detection server detects an error, the ADI may present anomaly detection alerts and diagnoses in the context of the process as a whole.

Once we have an abnormal, we want to use partial pattern recognition which is much more complex and cannot be described by simple rules. This is where we want to use machine learning and hierarchical pattern matching in order to more complexly describe a normal running state and a partial anomalous state. We also want to correlate video to more accurately capture normal machine state by bringing in more supporting data from the environment.

In some examples, the anomaly detection server is also configured to provide reporting and analytics on the health of a machine, a group of machines, a process, or an entire facility and indicate rates of anomalies and trends in anomalies. Such analytics may be used to ascertain the effectiveness of the ADS and to identify potential machines or processes that experience unusual anomaly rates or other patterns. The ADS may also provide data on, for example, sensitivity of the anomaly detection server or selectivity of the anomaly detection server. Sensitivity is a measure of total anomalies detected ("TA") divided by total anomalies plus false normal ("FN"). As used herein, "false normal" is an indication where the ADS incorrectly reports that no anomaly is present when one is present. To facilitate capture of FNs, the ADI may receive input from users indicating that a particular pattern that was identified as normal was actually anomalous. Thus, the formula for sensitivity s may be described as:

$$s = \frac{TA}{TA + FN}$$

The anomaly detection server may further retrain based on sensitivity calculations to become more or less sensitive, depending upon parameters provided by users at the ADI. Specifically, if a user seeks the ADS to report more potential anomalies with a risk of false positives, the user may set a parameter to increase sensitivity. Conversely, if a user seeks the ADS to report fewer potential anomalies with a risk of false normal, the user may set a parameter to reduce sensitivity. In most examples, because users seek to reduce RTTM, parameters will be set in the ADI to avoid oversensitivity or under-sensitivity.

The ADS may also report on selectivity which is given as the total number of normal states detected ("TN") divided by the total number of normal states plus false anomalies ("FA"). Thus, the formula for selectivity se may be described as:

$$se = \frac{TN}{TN + FA}$$

Like sensitivity, users may adjust the selectivity with parameters to cause the anomaly detection server to be more or less selective.

Generally, the systems and methods described herein are configured to perform at least the following steps: receive a plurality of training analysis vectors associated with a monitored machine during a training period from the at least one sensor, wherein each of the training analysis vectors describe a condition of the monitored machine at a corresponding point in time; apply the training analysis vectors to a machine learning model to create a trained machine learning model configured to describe normal states in the monitored machine as indicated by training analysis vectors; receive a plurality of monitoring analysis vectors associated with the monitored machine during a monitoring period from the at least one sensor, wherein each of the monitoring analysis vectors describe a condition of the monitored machine at a corresponding point in time; apply the plurality of monitoring analysis vectors to the trained machine learning model to identify at least one discrepancy indicating an anomalous state in the monitored machine; transmit an alert indicating that an anomaly is detected in the monitored machine; receive a registration input defining finite states of the monitored machine; process the registration input to create a first map configured to convert machine condition data into a corresponding analysis vector representing a corresponding state of the monitored machine; receive a plurality of training machine condition data associated with the monitored machine during the training period; process the plurality of training machine condition data with the first map to receive the plurality of training analysis vectors; receive a plurality of monitoring machine condition data associated with the monitored machine during a monitoring period; process the plurality of monitoring machine condition data with the first map to receive the plurality of monitoring analysis vectors; receive the plurality of training analysis vectors associated with the monitored machine during the training period, wherein each of the training analysis vectors is associated with a timing indicator representing the relative time of each of the training analysis vectors; apply the training analysis vectors to a machine learning model to create the trained machine learning model configured to identify normal sequenced patterns in the monitored machine, wherein the normal sequenced patterns represent an ordered sequence of identified normal states; receive the plurality of monitoring analysis vectors associated with the monitored machine during the monitoring period, wherein each of the monitoring analysis vectors is associated with a timing indicator representing the relative time of each of the monitoring analysis vectors; process the plurality of monitoring analysis vectors with the corresponding timing indicators to obtain a sequenced monitoring pattern of monitored states; apply the sequenced monitoring pattern to the trained machine learning model to identify at least one discrepancy indicating an anomalous pattern in the monitored machine; transmit the alert indicating that an anomaly is detected in the monitored machine; receive a first user resolution input regarding the alert indicating whether the alert was associated with a false positive anomaly or a confirmed anomaly; train the machine learning model with the first user resolution input; receive a first user resolution input regarding the alert indicating a determined reason for the anomaly; train the machine learning model with the first user resolution input such that the machine learning model is configured to provide the determined reason for the anomaly when a corresponding future anomaly is detected; receive a user sensitivity input parameter indicating a preference for sensitivity of the machine learning model; train the machine learning model based on the sensitivity input; receive a user selectivity input parameter indicating a preference for sensitivity of the machine learning model; train the machine learning model based on the selectivity input; receive the plurality of training analysis vectors from a sensor in communication with the monitored machine; receive a set of image input from a camera of the monitored machine; and process the set of image input into the plurality of training analysis vectors.

FIG. 1 is a schematic diagram of an example environment 100 for anomaly detection in a machine 120 by an anomaly detection server 110. Specifically, anomaly detection server 110 includes processor 111, memory 112, input/output 113, and communications device 114. Anomaly detection server 110 is in communication with sensors 121, 122, 123, and 124 in machine 120. Sensors 121, 122, 123, and 124 are configured to capture machine condition data and provide it via a suitable networking protocol (such as via network 104 or direct communication) to anomaly detection server 110 as described herein. In some examples, machine condition data is provided as analysis vectors and in others machine condition data is provided in any suitable format including analog signal data, digital signal data, audio data, video data, or image data. In some examples, machine 120 also includes camera 125 capable of capturing machine images and/or video showing internal or external conditions of machine 120.

Anomaly detection server 110 may also be in communication with user computing device 130 which includes corresponding processor 131, memory 132, input/output 133, and communications device 134. In some embodiments, the ADS and associated human machine interfaces ("HMI") such as ADI may be provided via user computing device 130 or via anomaly detection server 110 directly. Thus, interfaces for registration, reporting, anomaly alerts, anomaly diagnoses, and anomaly resolution may be provided through either system 110 or 130 or any other suitable device connected thereto.

Figure 2:
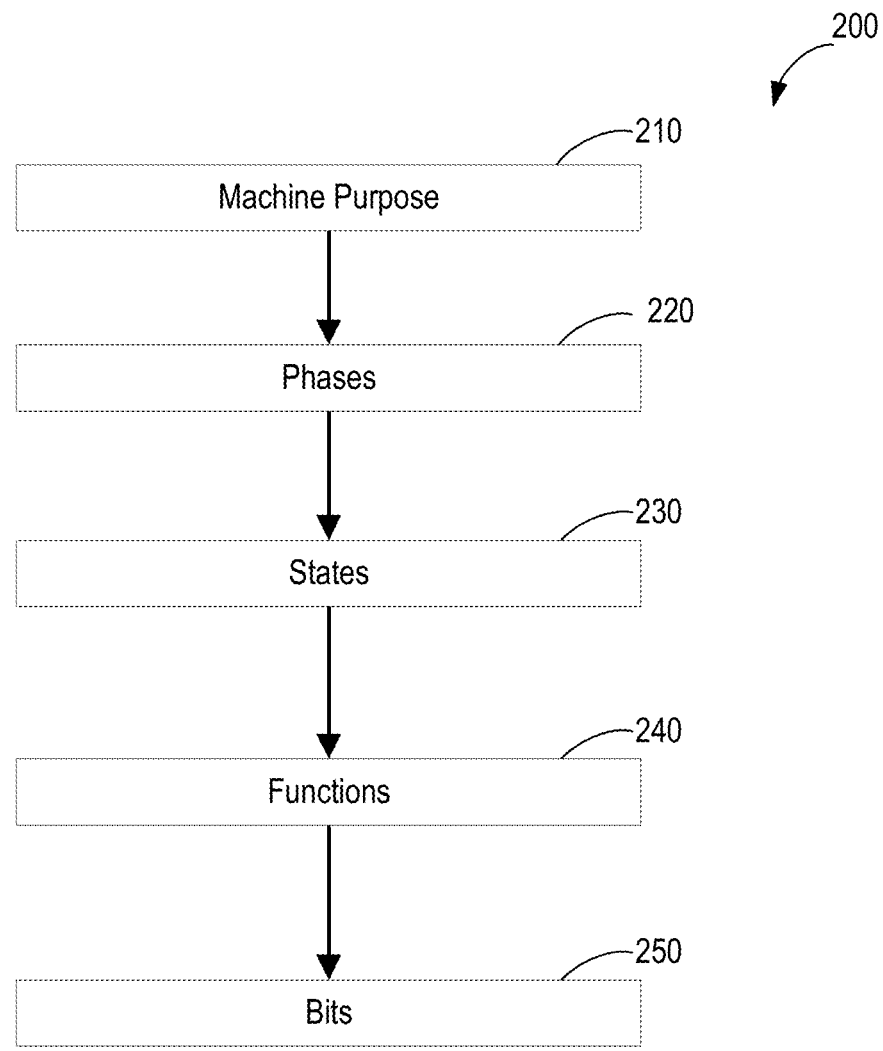
FIG. 2 is a hierarchical flowchart describing relationships between concepts used in anomaly detection of machines described herein.

FIG. 2 is a hierarchical flowchart 200 describing relationships between concepts used in anomaly detection of machines described herein. As described above, each machine 120 (shown in FIG. 1) is associated with a machine purpose 210. As used herein, a machine purpose describes the role of each machine in the relevant process, describing what result each machine provides for the process. To fulfill its machine purpose 210, each machine 120 performs one or more phases 220 of operation. As used herein, a "phase" is a group or combination of steps which typically are associated with a real-world task performed by the machine at issue. In executing each phase 220, each machine 120 performs multiple steps and experiences multiple states 230. As used herein, the term "state" refers to unique condition of the system as determined by machine condition data or other data. In each state 230, each machine 120 performs multiple functions 240. As used herein, the term "function" represents a collection of values (e.g., hexadecimal values or bits) that represent sub-systems in a particular machine. In performing each "function", each machine 120 has an associated bit value 250. As used herein, "bits" are any suitable digit (e.g., binary or hexadecimal) representing the condition of a part or component. Bit 250 may represent a physical input, physical output, or a processing step.

Figure 3:
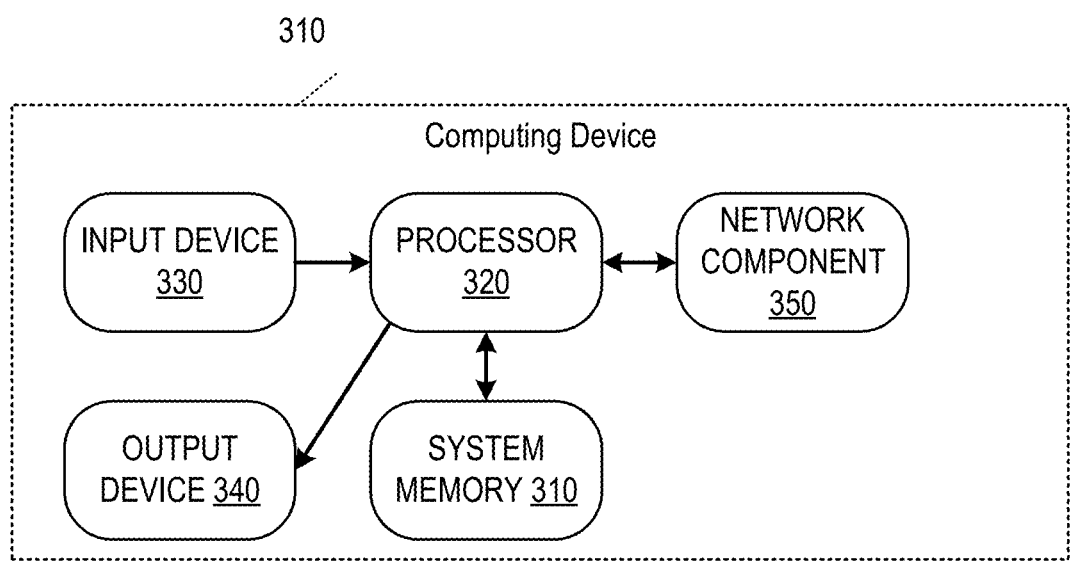
FIG. 3 is a block diagram of an example computing system that may be used to perform one or more computing operations.

FIG. 3 is a block diagram of an example computing system 300 that may be used to perform one or more computing operations. While examples of the disclosure are illustrated and described herein with reference to the anomaly detection server 110 or user computing device 130 being a computing system 300, aspects of the disclosure are operable with any computing system that executes instructions to implement the operations and functionality associated with the computing system 300. The computing system 300 shows only one example of a computing environment for performing one or more computing operations and is not intended to suggest any limitation as to the scope of use or functionality of the disclosure.

In some examples, the computing system 300 includes a system memory 310 (e.g., computer storage media) and a processor 320 coupled to the system memory 310. The processor 320 may include one or more processing units (e.g., in a multi-core configuration). Although the processor 320 is shown separate from the system memory 310, examples of the disclosure contemplate that the system memory 310 may be onboard the processor 320, such as in some embedded systems.

The processor 320 is programmed or configured to execute computer-executable instructions stored in the system memory 310 to detect anomalies in a machine or machines and to train a machine learning model to perform such detection. The system memory 310 includes one or more computer-readable media that allow information, such as the computer-executable instructions and other data, to be stored and/or retrieved by the processor 320. Some examples include a computer program product embodied on a non-transitory computer-readable medium (e.g., system memory 310) that the processor 320 executes to perform the steps described in FIG. 4 and to otherwise perform the functions of the anomaly detection server including provision of the ADS and ADI.

By way of example, and not limitation, computer-readable media may include computer storage media and communication media. Computer storage media are tangible and mutually exclusive to communication media. For example, the system memory 310 may include computer storage media in the form of volatile and/or nonvolatile memory, such as read-only memory (ROM), programmable ROM (PROM), erasable PROM (EPROM), electrically erasable PROM (EEPROM), solid-state storage (SSS), flash memory, magnetic tape, a floppy disk, a hard disk, a compact disc (CD), a digital versatile disc (DVD), a memory card, random-access memory (RAM), static RAM (SRAM), dynamic RAM (DRAM), synchronous DRAM (SDRAM), double data rate SDRAM (DDR SDRAM), and/or any other medium that may be used to store desired information that may be accessed by the processor 320. Computer storage media are implemented in hardware and exclude carrier waves and propagated signals. That is, computer storage media for purposes of this disclosure are not signals per se.

A user (e.g., an engineer or technician) may enter commands and other input into the computing system 300 through one or more input devices 330 (e.g., a touchscreen, a keyboard, or a tablet) coupled to the processor 320 or via a user computing device 130 in communication with the anomaly detection server 110. The input devices 330 are configured to receive information. Example input device 330 include, without limitation, a pointing device (e.g., mouse, trackball, touch pad, joystick), a keyboard, a game pad, a controller, a microphone, a camera, a gyroscope, an accelerometer, a position detector, and an electronic digitizer (e.g., on a touchscreen). Information, such as text, images, video, audio, and the like, may be presented to a user via one or more output devices 340 (e.g., actuator 130) coupled to the processor 320. The output devices 340 are configured to convey information. Example output devices 340 include, without limitation, a monitor, a projector, a printer, a speaker, a vibrating component. In some examples, an output device 340 is integrated with an input device 330 (e.g., a capacitive touch-screen panel, a controller including a vibrating component). As used herein, output devices 340 are configured to and capable of providing output that may be a signal to actuator 130 from the perspective of the computing system 300 or components embodied thereon, including a programmable logic controller ("PLC"). In one example, the output signal is a numeric value such as a binary value. The output signal may be represented at a length of one or more digits. In the example embodiment, a vector can contain sixteen (16) output signals or input signals from systems or machines that are sent to input device 330 and thereby represent the state of a system or machine. The vector may alternately be referred to as an analysis vector or a machine vector.

One or more network components 350 may be used to operate the computing system 300 in a networked environment using one or more logical connections. Logical connections include, for example, local area networks, wide area networks, and the Internet. The network components 350 allow the processor 320, for example, to convey information to and/or receive information from one or more remote devices, such as another computing system or one or more remote computer storage media. Network components 350 may include a network adapter, such as a wired or wireless network adapter or a wireless data transceiver.

Figure 4:
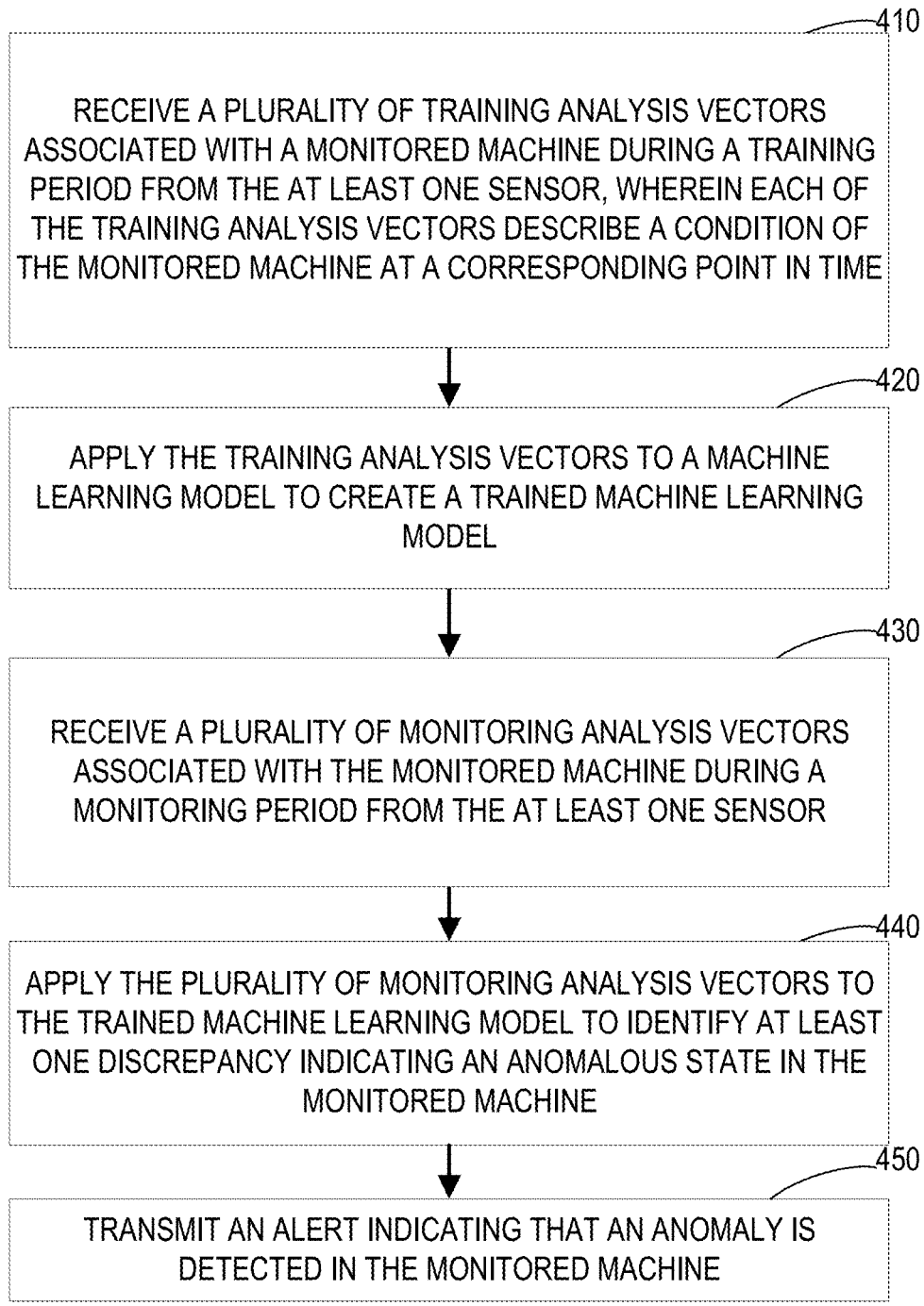
FIG. 4 is a flowchart of an example method of anomaly detection, such as in the environment of FIG. 1.

FIG. 4 is a flowchart of an example method 400 of anomaly detection, such as in the environment of FIG. 1. Anomaly detection server 110 (shown in FIG. 1) is configured to cause processor 111 to receive 410 a plurality of training analysis vectors associated with a monitored machine during a training period from the at least one sensor, wherein each of the training analysis vectors describe a condition of the monitored machine at a corresponding point in time. Anomaly detection server 110 also causes processor 111 to apply 420 the training analysis vectors to a machine learning model to create a trained machine learning model configured to describe normal states in the monitored machine as indicated by training analysis vectors. Anomaly detection server 110 also causes processor 111 to receive 430 a plurality of monitoring analysis vectors associated with the monitored machine during a monitoring period from the at least one sensor, wherein each of the monitoring analysis vectors describe a condition of the monitored machine at a corresponding point in time. Anomaly detection server 110 also causes processor 111 to apply 440 the plurality of monitoring analysis vectors to the trained machine learning model to identify at least one discrepancy indicating an anomalous state in the monitored machine. Anomaly detection server 110 also causes processor 111 to transmit 450 an alert indicating that an anomaly is detected in the monitored machine.

Figure 5:
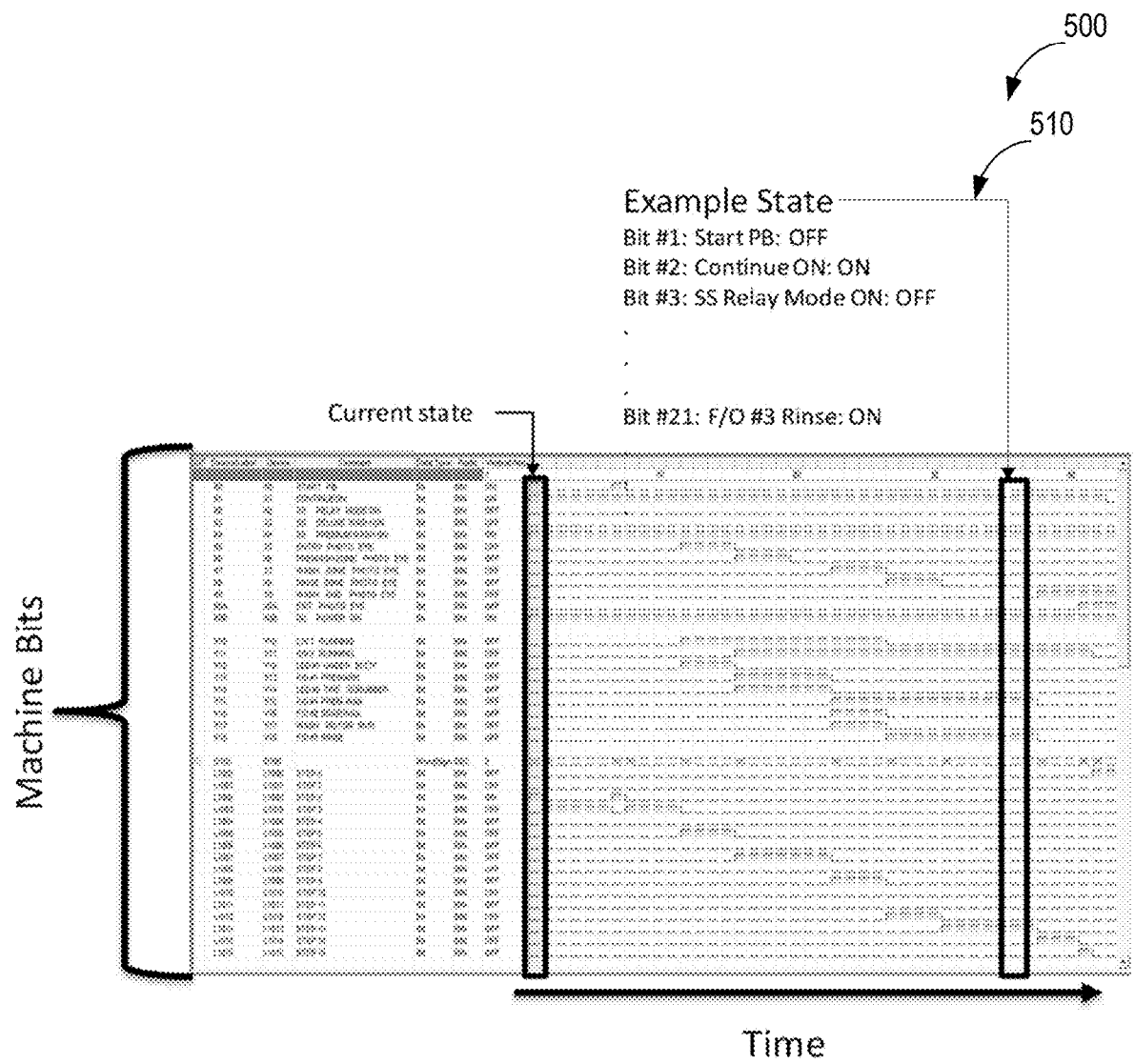
FIG. 5 is an illustration of a series of analysis vectors or vectors or machine vectors that may be used by the example computing system of FIG. 3 to perform anomaly detection as indicated in FIG. 4.

FIG. 5 is an illustration 500 of a series of analysis vectors or vectors or machine vectors that may be used by the example computing system 310 (shown in FIG. 3) to perform anomaly detection as indicated in FIG. 4. In this example, each system or machine provides, via a suitable sensor, input, or output, output or input signals to computing system 310. In the illustrated example of illustration 500, a series of vectors are shown for a particular machine. For simplicity of illustration, the indicated vectors are shown in binary with a bit indicated in a dash ("-") showing a 0 (or off) and a bit indicated in a filled in space showing a 1 (or on). Thus, each vector captures a state for a particular state, sequence, or timing for a machine. In the illustrated column 510, a series of bit values are shown for a series of vectors. As show in the associated text, at vector 1, the bit value is off and indicates a Start process is OFF, at vector 2, the bit value is on and indicates that a continue value is ON, at vector 3, the bit value is on and indicates that a SS Relay Mode is ON, and at vector 21, the bit value F/O #3 Rinse is ON. Thus, over distinct vectors, the distinct bit values vary and capture the machine state distinctly. As described herein, bits are binary values but can be compressed into other units such as hexadecimal.

Figure 6:
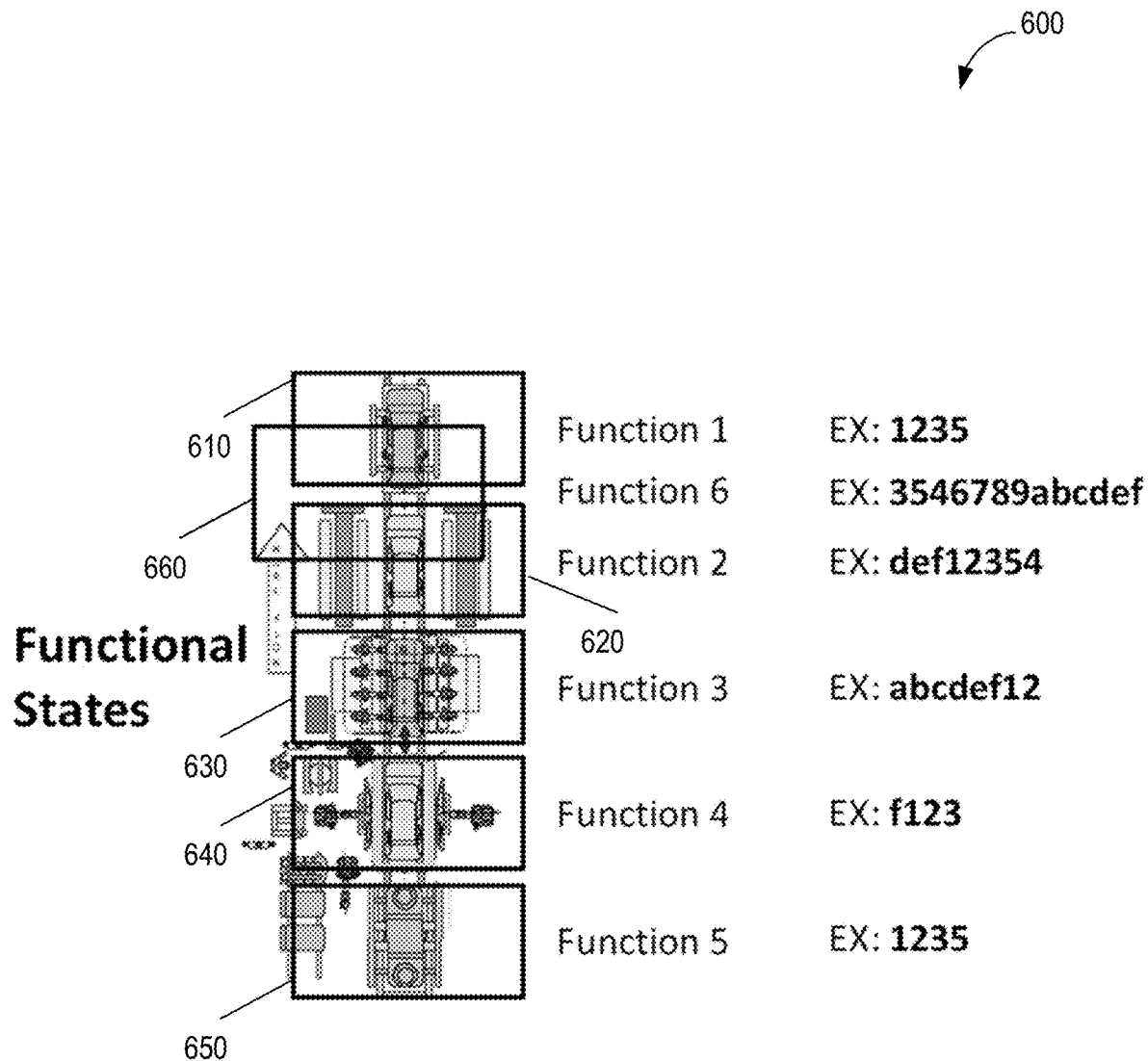
FIG. 6 is an illustration of a functional map that identifies portions of a system from which associated Functions and analysis vectors or vectors or machine vectors may be derived, which may be used by the example computing system of FIG. 3 to perform anomaly detection as indicated in FIG. 4.

FIG. 6 is an illustration of a functional map 600 that identifies portions of a system from which associated Functions and analysis vectors or vectors or machine vectors may be derived, which may be used by the example computing system 310 (shown in FIG. 3) to perform anomaly detection as indicated in FIG. 4. In FIG. 6, functional states for Functions 1-6 are shown as represented in vectors (described in more detail in FIG. 7) and associated with corresponding physical portions of a machine or system indicated in 610, 620, 630, 640, 650, and 660. As described above, defining the portions 610, 620, 630, 640, 650, and 660 associated with Functions 1-6 requires the creation of a functional map (whether by a human, through automation, or a combination thereof). In some examples, portions may be defined by discrete and obvious portions of a machine, while in others, portions may span the components of one or more machines as shown in portion 660 and corresponding Function 6. (For clarity, portion 610 corresponds to Function 1, portion 620 corresponds to Function 2, portion 630 corresponds to Function 3, portion 640 corresponds to Function 4, portion 650 corresponds to Function 5, and portion 660 corresponds to Function 6. Further, the illustrative examples adjacent to the right of each Function are illustrative vectors or analysis vectors describing the state of each corresponding portion 610, 620, 630, 640, 650, and 660.)

Figure 7:
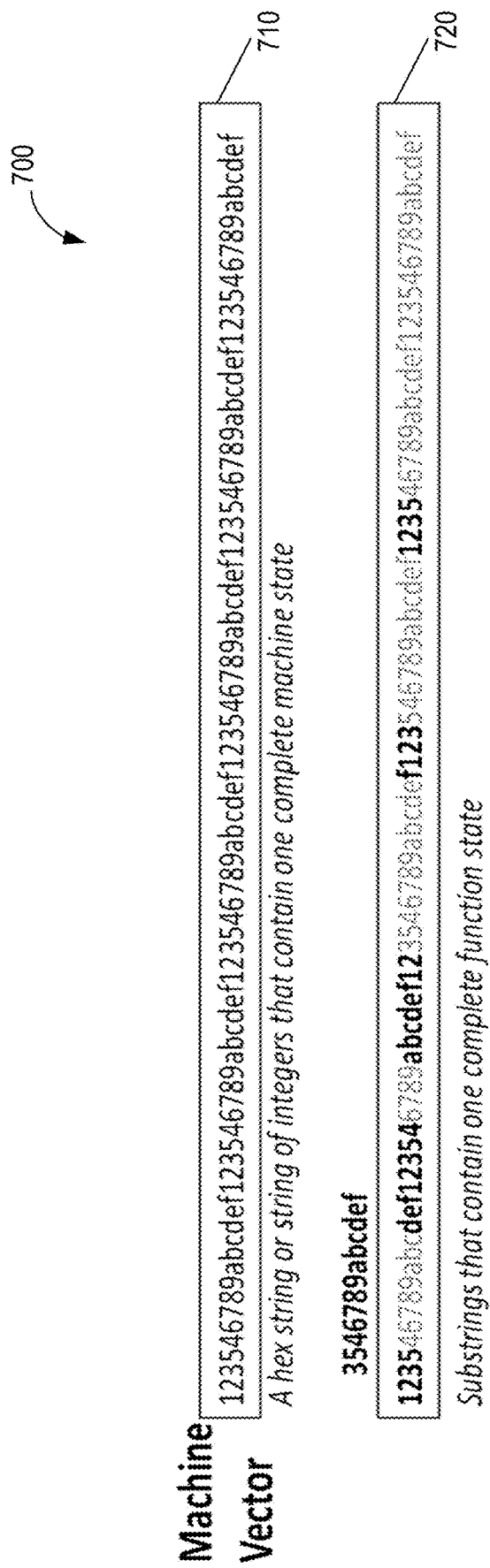
FIG. 7 is a graphical description and illustration of example analysis vectors or vectors or machine vectors that may be used by the example computing system of FIG. 3 to perform anomaly detection as indicated in FIG. 4.

FIG. 7 is a graphical description and illustration 700 of example analysis vectors or vectors or machine vectors that may be used by the example computing system of FIG. 3 to perform anomaly detection as indicated in FIG. 4. For clarity, a vector (or analysis vector or machine vector) may be defined as follows. In one example, a vector or a machine vector or an analysis vector is represented as a numeric integer or string of values (of hexadecimals, decimals, binary, or any other suitable base) that contain one or more machine state(s) as shown in 710. Within the vector are substrings (indicated in bold in 720) that contain one or more complete function state and are based on registers from one or more input values or output values.

Figure 8:
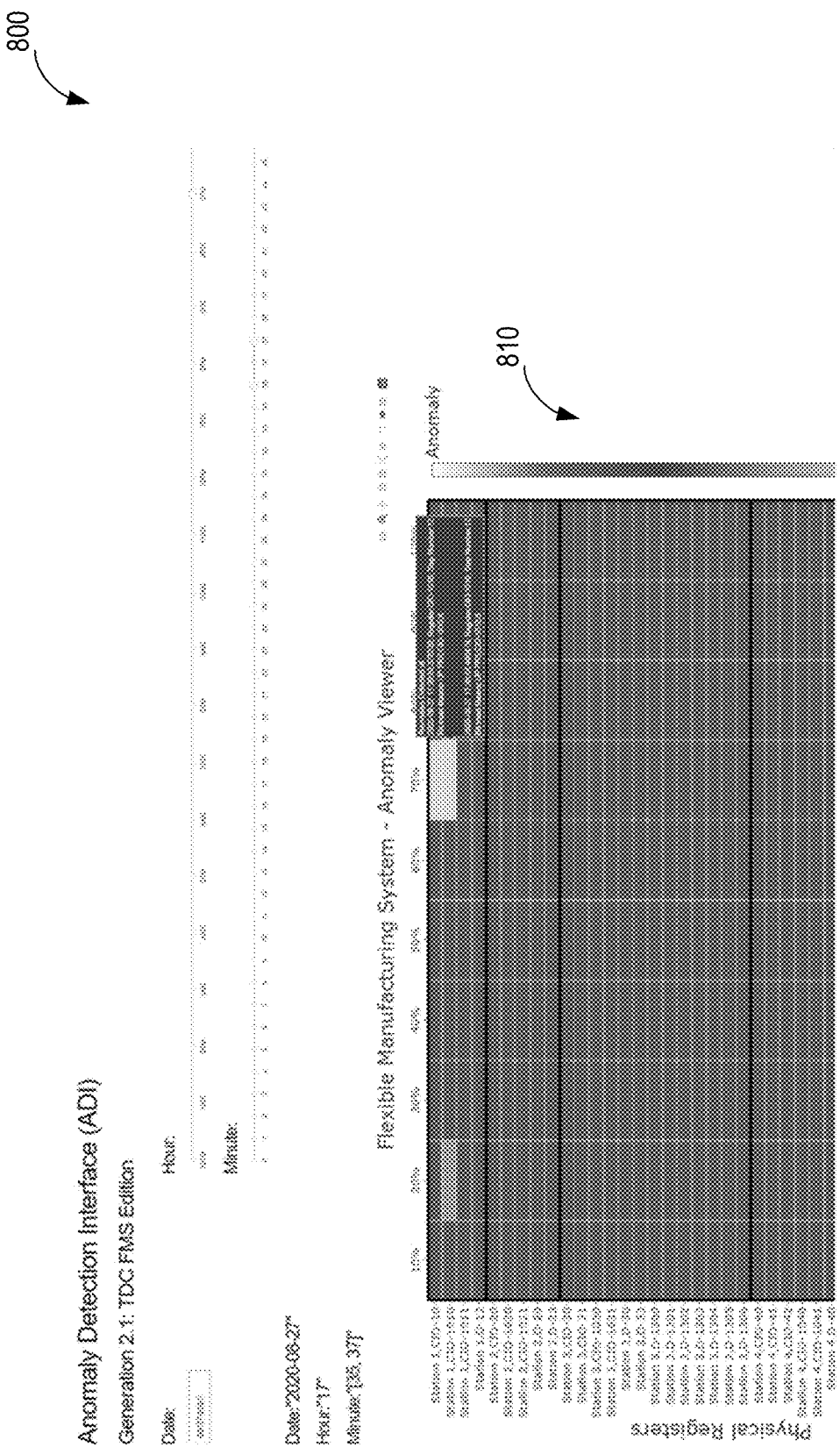
FIG. 8 is a second illustration of a series of analysis vectors or vectors or machine vectors that may be used by the example computing system of FIG. 3 to perform anomaly detection as indicated in FIG. 4, from the perspective of an anomaly detection interface ("ADI") that may be provided by the example computing system.

FIG. 8 is a second illustration 800 of a series of analysis vectors or vectors or machine vectors that may be used by the example computing system 310 (shown in FIG. 3) to perform anomaly detection as indicated in FIG. 4, from the perspective of an anomaly detection interface ("ADI") that may be provided by the example computing system. As described above, the ADI provides an example of the output a user will see. In the illustration 800, the ADI simplifies output so that minimal user is required. In one aspect, the ADI presents anomaly severity using suitable user indications (e.g., color coding, styling, or alerts) to indicate when an anomaly is severe. In the illustrated example of illustration 800, anomalies are differently shaded to indicate severity. In one example, anomalies are shaded according to a scale of colors or gradients that move from normal to mild anomalies to severe anomalies. In illustration 800, the ADI also indicates the presence of anomalies at varying cycle completion percentages. In the example, the percentages vary by decile, moving from 0-100 percent in ten percent increments. In illustration 800, an anomaly scale 810 is shown to indicate the relative severity of anomalies given by a particular color value.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be or include, for example, magnetic tape, a floppy disk, a hard disk, a compact disc (CD), a digital versatile disc (DVD), a memory card, and/or a flash drive. The disk can store an operating system that controls or allocates resources of a computing device.

A "database", as used herein can refer to table, a set of tables, and a set of data stores and/or methods for accessing and/or manipulating those data stores. Some databases can be incorporated with a disk as defined above.

A "memory", as used herein can include non-volatile memory and/or volatile memory. Non-volatile memory can include, for example, read-only memory (ROM), programmable ROM (PROM), erasable PROM (EPROM), electrically erasable PROM (EEPROM), solid-state drives, and/or disks. Volatile memory can include, for example, random-access memory (RAM), static RAM (SRAM), dynamic RAM (DRAM), synchronous DRAM (SDRAM), and/or double data rate SDRAM (DDR SDRAM). The memory can store an operating system that controls or allocates resources of a computing device.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various units to execute various functions.

A "unit" or "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another unit, module, method, and/or system. A unit or module may also include logic, a software controlled microprocessor, a discrete logic circuit, an analog circuit, a digital circuit, a programmed logic device, a memory device containing executing instructions, logic gates, a combination of gates, and/or other circuit components. Multiple units or modules may be combined into one unit and single units or modules may be distributed among multiple units or modules.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage. In other cases, the value or level of X could be a value in a range. In still other cases, the value or level of X may not be a numerical value, but could be associated with a given discrete state, such as "not X", "slightly X", "X", "very X" and "extremely X."

Examples are described herein and illustrated in the accompanying drawings to disclose aspects of the disclosure and also to enable a person skilled in the art to practice the aspects, including making or using the above-described systems and executing or performing the above-described methods. The anomaly detection systems and methods described function to improve the technological field of machine maintenance, anomaly detection, and industrial production.

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

It should be apparent from the foregoing description that various examples may be implemented in hardware. Furthermore, various examples may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

When introducing elements of the disclosure or the examples thereof, the articles "a", "an", "the" and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for detecting an anomalous state in a machine performed by an anomaly detection server, the method comprising:
   receiving a plurality of training analysis vectors associated with a monitored machine during a training period, wherein each of the plurality of training analysis vectors describe a condition of the monitored machine at a corresponding point in time;
   applying the plurality of training analysis vectors to a machine learning model to create a trained machine learning model configured to describe normal patterns of states in the monitored machine across sequences and timing as indicated by the plurality of training analysis vectors;
   receiving a plurality of monitoring analysis vectors associated with the monitored machine during a monitoring period, wherein each of the plurality of monitoring analysis vectors describe a condition of the monitored machine at a corresponding point in time;
   applying the plurality of monitoring analysis vectors to the trained machine learning model to identify monitored patterns of states in the monitored machine across sequences and timing as indicated by the plurality of monitoring analysis vectors and scan for at least one discrepancy indicating an anomalous state in the monitored machine by comparing the monitored patterns of states across sequences and timing to the normal patterns of states across sequences and timing; and on condition that a discrepancy exists between the monitored patterns of states across sequences and timing and the normal patterns of states across sequences and timing, transmitting an alert indicating that an anomaly is detected in the monitored machine.

2. The method of claim 1, further comprising:
receiving a registration input defining finite states of the monitored machine;
processing the registration input to create a first map configured to convert machine condition data into a corresponding analysis vector representing a corresponding state of the monitored machine;
receiving a plurality of training machine condition data associated with the monitored machine during the training period; and
processing the plurality of training machine condition data with the first map to receive the plurality of training analysis vectors.

3. The method of claim 2, further comprising:
receiving a plurality of monitoring machine condition data associated with the monitored machine during a monitoring period; and
processing the plurality of monitoring machine condition data with the first map to receive the plurality of monitoring analysis vectors.

4. The method of claim 1, further comprising:
receiving the plurality of training analysis vectors associated with the monitored machine during the training period, wherein each of the training analysis vectors is associated with a timing indicator representing the relative time of each of the training analysis vectors;
applying the plurality of training analysis vectors to the machine learning model to create the trained machine learning model configured to identify the normal patterns of states in the monitored machine across sequences and timing, wherein the normal patterns of states in the monitored machine across sequences and timing represent an ordered sequence of identified normal states;
receiving the plurality of monitoring analysis vectors associated with the monitored machine during the monitoring period, wherein each of the monitoring analysis vectors is associated with a timing indicator representing the relative time of each of the monitoring analysis vectors;
processing the plurality of monitoring analysis vectors with the corresponding timing indicators to obtain the monitored patterns of states in the monitored machine across sequences and timing.

5. The method of claim 1, further comprising:
receiving a first user resolution input regarding the alert indicating whether the alert was associated with a false positive anomaly or a confirmed anomaly; and
training the machine learning model with the first user resolution input.

6. The method of claim 1, further comprising:
receiving a first user resolution input regarding the alert indicating a determined reason for the anomaly; and
training the machine learning model with the first user resolution input such that the machine learning model is configured to provide the determined reason for the anomaly when a corresponding future anomaly is detected.

7. The method of claim 1, further comprising:
receiving a user sensitivity input parameter indicating a preference for sensitivity of the machine learning model; and training the machine learning model based on the sensitivity input.

8. The method of claim 1, further comprising:
receiving a user selectivity input parameter indicating a preference for sensitivity of the machine learning model; and
training the machine learning model based on the selectivity input.

9. The method of claim 1, further comprising:
receiving the plurality of training analysis vectors from a sensor in communication with the monitored machine.

10. An anomaly detection system for detecting an anomalous state in a machine comprising:
a machine including at least one sensor device configured to monitor the machine condition; and
an anomaly detection server in communication with the at least one sensor device, said anomaly detection server comprising a memory and a processor, said processor is configured to:
receive a plurality of training analysis vectors associated with a monitored machine during a training period from the at least one sensor, wherein each of the plurality of training analysis vectors describe a condition of the monitored machine at a corresponding point in time;
apply the plurality of training analysis vectors to a machine learning model to create a trained machine learning model configured to describe normal patterns of states in the monitored machine across sequences and timing as indicated by the plurality of training analysis vectors;
receive a plurality of monitoring analysis vectors associated with the monitored machine during a monitoring period from the at least one sensor, wherein each of the plurality of monitoring analysis vectors describe a condition of the monitored machine at a corresponding point in time;
apply the plurality of monitoring analysis vectors to the trained machine learning model to identify monitored patterns of states in the monitored machine across sequences and timing as indicated by the plurality of monitoring analysis vectors and scan for at least one discrepancy indicating an anomalous state in the monitored machine by comparing the monitored patterns of states across sequences and timing to the normal patterns of states across sequences and timing; and
on condition that a discrepancy exists between the monitored patterns of states across sequences and timing and the normal patterns of states across sequences and timing, transmit an alert indicating that an anomaly is detected in the monitored machine.

11. The anomaly detection system of claim 10, wherein the processor is further configured to:
receive a registration input defining finite states of the monitored machine;
process the registration input to create a first map configured to convert machine condition data into a corresponding analysis vector representing a corresponding state of the monitored machine;
receive a plurality of training machine condition data associated with the monitored machine during the training period; and
process the plurality of training machine condition data with the first map to receive the plurality of training analysis vectors.

12. The anomaly detection system of claim 11, wherein the processor is further configured to:
- receive a plurality of monitoring machine condition data associated with the monitored machine during a monitoring period; and
- process the plurality of monitoring machine condition data with the first map to receive the plurality of monitoring analysis vectors.

13. The anomaly detection system of claim 10, wherein the processor is further configured to:
- receive the plurality of training analysis vectors associated with the monitored machine during the training period, wherein each of the training analysis vectors is associated with a timing indicator representing the relative time of each of the training analysis vectors;
- apply the plurality of training analysis vectors to the machine learning model to create the trained machine learning model configured to identify the normal patterns of states in the monitored machine across sequences and timing, wherein the normal patterns of states in the monitored machine across sequences and timing represent an ordered sequence of identified normal states;
- receive the plurality of monitoring analysis vectors associated with the monitored machine during the monitoring period, wherein each of the monitoring analysis vectors is associated with a timing indicator representing the relative time of each of the monitoring analysis vectors;
- process the plurality of monitoring analysis vectors with the corresponding timing indicators to obtain the monitored patterns of states in the monitored machine across sequences and timing.

14. The anomaly detection system of claim 10, wherein the processor is further configured to:
- receive a first user resolution input regarding the alert indicating whether the alert was associated with a false positive anomaly or a confirmed anomaly; and
- train the machine learning model with the first user resolution input.

15. The anomaly detection system of claim 10, wherein the processor is further configured to:
- receive a first user resolution input regarding the alert indicating a determined reason for the anomaly; and
- train the machine learning model with the first user resolution input such that the machine learning model is configured to provide the determined reason for the anomaly when a corresponding future anomaly is detected.

16. The anomaly detection system of claim 10, wherein the processor is further configured to:
- receive a user sensitivity input parameter indicating a preference for sensitivity of the machine learning model; and
- train the machine learning model based on the sensitivity input.

17. The anomaly detection system of claim 10, wherein the processor is further configured to:
- receive a user selectivity input parameter indicating a preference for sensitivity of the machine learning model; and
- train the machine learning model based on the selectivity input.

18. The anomaly detection system of claim 10, wherein the processor is further configured to:
- receive the plurality of training analysis vectors from a sensor in communication with the monitored machine.

19. The anomaly detection system of claim 10, further comprising a camera in communication with the anomaly detection server, said camera is configured to capture images of the monitored machine, wherein the processor is further configured to:
- receive a set of image input from said camera of the monitored machine in the training period; and
- process the set of image input into the plurality of training analysis vectors.

20. An anomaly detection server in communication with at least one sensor device, said anomaly detection server comprising a memory and a processor, said processor is configured to:
- receive a plurality of training analysis vectors associated with a monitored machine during a training period from the at least one sensor, wherein each of the plurality of training analysis vectors describe a condition of the monitored machine at a corresponding point in time;
- apply the plurality of training analysis vectors to a machine learning model to create a trained machine learning model configured to describe normal patterns of states in the monitored machine across sequences and timing as indicated by the plurality of training analysis vectors;
- receive a plurality of monitoring analysis vectors associated with the monitored machine during a monitoring period from the at least one sensor, wherein each of the plurality of monitoring analysis vectors describe a condition of the monitored machine at a corresponding point in time;
- apply the plurality of monitoring analysis vectors to the trained machine learning model to identify monitored patterns of states in the monitored machine across sequences and timing as indicated by the plurality of monitoring analysis vectors and scan for at least one discrepancy indicating an anomalous state in the monitored machine by comparing the monitored patterns of states across sequences and timing to the normal patterns of states across sequences and timing; and
- on condition that a discrepancy exists between the monitored patterns of states across sequences and timing and the normal patterns of states across sequences and timing, transmit an alert indicating that an anomaly is detected in the monitored machine.

* * * * *